March 4, 1941. W. H. HUTH ET AL Re. 21,735

AUDIOMETER

Original Filed June 24, 1937 2 Sheets-Sheet 1

Inventors:
Walter H. Huth
Joseph R. Cubert
By: Arthur F. Durand
Atty.

March 4, 1941. W. H. HUTH ET AL Re. 21,735
AUDIOMETER
Original Filed June 24, 1937 2 Sheets-Sheet 2
FIG. 6.
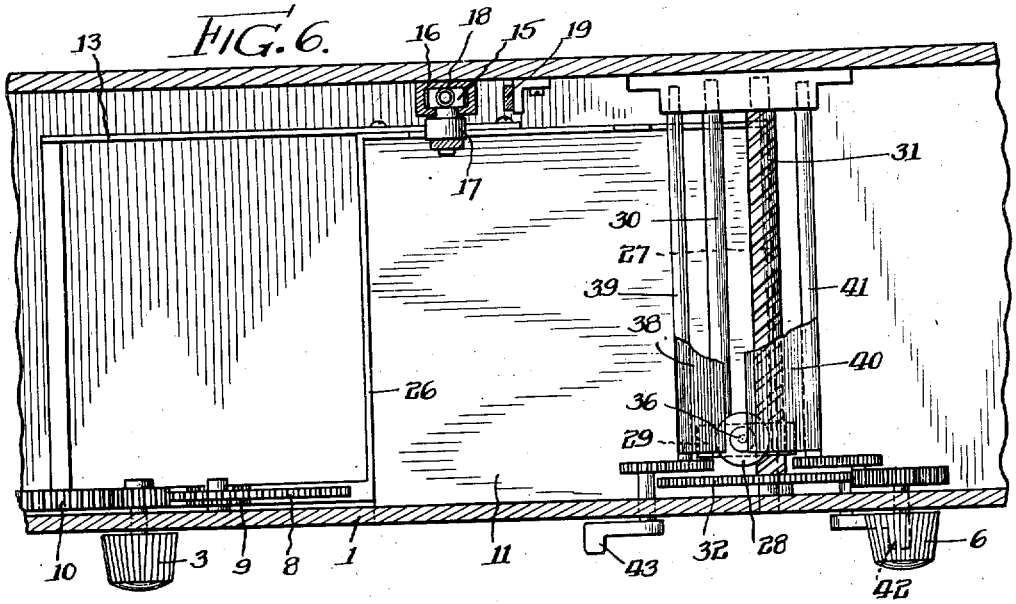
FIG. 7.
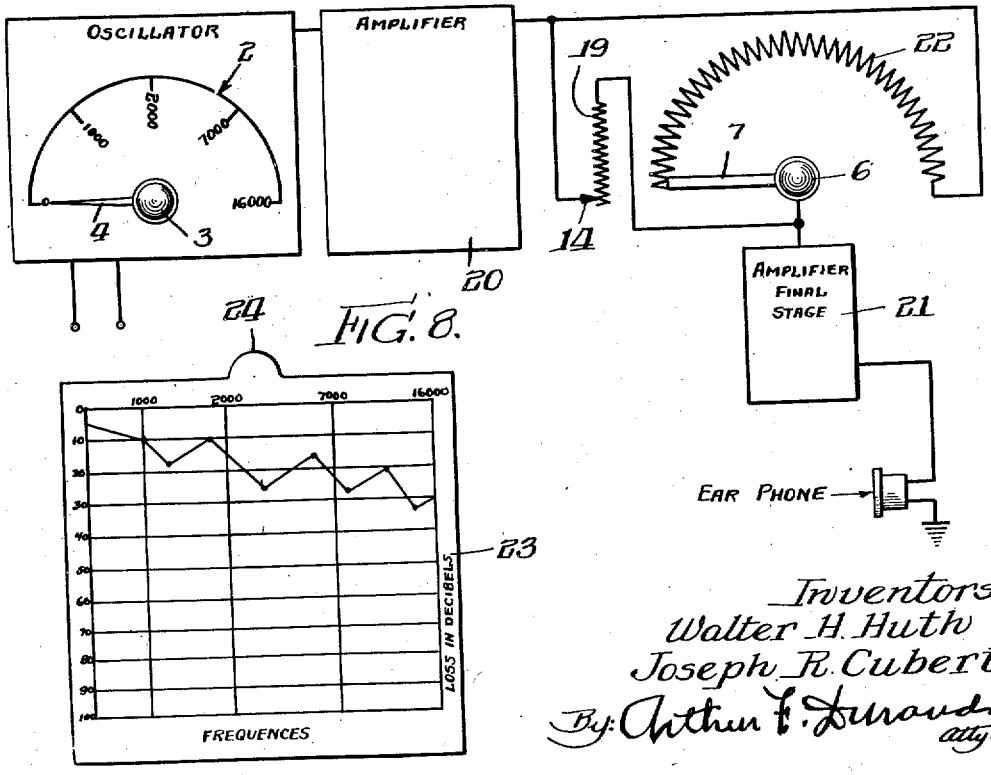
FIG. 8.
Inventors:
Walter H. Huth
Joseph R. Cubert
By: Arthur F. Durand
Atty.

Reissued Mar. 4, 1941

Re. 21,735

UNITED STATES PATENT OFFICE 21,735

AUDIOMETER

Walter H. Huth and Joseph R. Cubert, Chicago, Ill., assignors to Aurex Corporation, Chicago, Ill., a corporation of Illinois Original No. 2,156,945, dated May 2, 1939, Serial No. 150,084, June 24, 1937. Application for reissue December 17, 1940, Serial No. 370,511

34 Claims. (Cl. 179—1)

This invention relates to so-called audiometers, of the kind that are used, for example, in testing the hearing, and which are commonly provided with a frequency dial and a decibel dial.

Generally stated, the object of the invention is to provide a novel and improved construction and arrangement whereby when the decibel dial is set at any given point thereon, and the frequency dial is then moved to different positions thereon, the number of decibels produced will remain the same as long as the decibel dial is undisturbed, and whereby only a single scale is necessary for the decibel dial, so that the making of a record of the testing of the hearing is simplified, and greater accuracy is insured.

Another object is to provide an improved construction and arrangement whereby the frequency dial is operative to also operate a support for a record card, so that the latter is given a feeding motion by the manual adjustment of the frequency dial, and whereby the operation of the decibel dial automatically moves a punch into position to be manually operated to engage the card, so that the operation of the two dials not only serves the primary purpose of each dial, but also assists in the making up of the record on the card.

To the foregoing and other useful ends, the invention consists in matters hereinafter set forth and claimed and shown in the accompanying drawings, in which—

Fig. 6 is a plan view and horizontal section of the instrument, showing certain portions thereof broken away.

Fig. 7 is a diagram of the circuit arrangement of the instrument.

Fig. 8 shows the record card on which the record of the hearing test is made.

Figure 1:
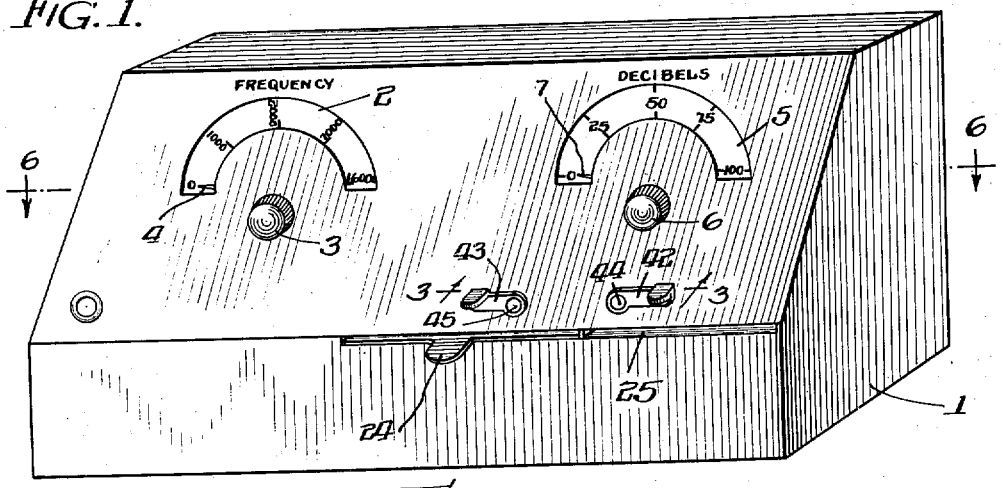
Fig. 1 is a perspective of an audiometer instrument embodying the principles of the invention.
Figure 2:
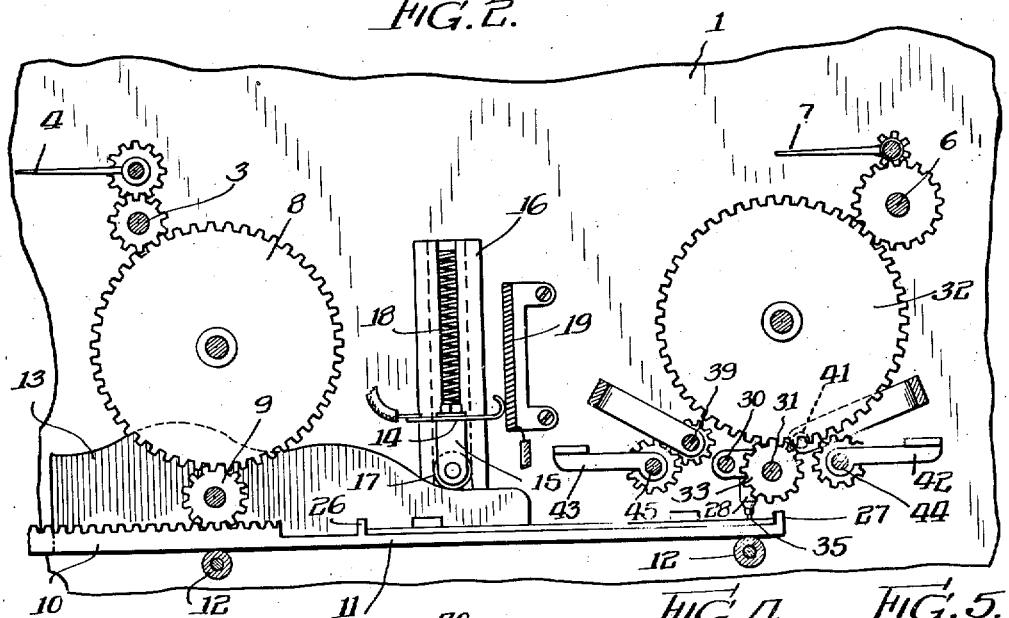
Fig. 2 is an enlarged sectional view, with certain portions of the structure shown broken away, showing the mechanism of the instrument.

As thus illustrated, the invention comprises a cabinet or housing 1, of any suitable or desired character, having a frequency scale 2 on the front thereo, with a knob 3 for operating the pointer 4 of the frequency dial thus formed. Also, the front of the instrument casing has a decibel scale 5 with a knob 6 for operating the pointer or hand 7 of the decibel dial thus formed. The instrumentalities and circuit arrangement, whereby the frequency dial is operative to produce different tones, by using different frequencies, is well known and well understood and does not need explanation here. This is also true of the decibel dial, as the instrumentalities and circuit arrangement, for a dial of this kind, which in effect is a volume control, are well known and well understood.

Therefore, the automatic arrangement whereby the decibel dial is operative with one scale, and does not need a plurality of scales, when the frequency dial is adjusted for different frequencies, is as follows: When the knob 3 is rotated, this rotates a gear wheel 8 below the shaft of the dial, and this in turn operates a pinion 9, and the latter operates the horizontally disposed and endwise reciprocating rack 10, which is rigid with the table 11, supported on rollers 12, so that this table has endwise motion, to the right, each time the knob 3 is turned counter-clockwise, and has reverse movement in the same horizontal lane when the said knob is turned clockwise. A cam 13 is rigid with the said table, and the electrical wiper or contact 14 is mounted on a slide 15 that slides up and down in the stationary guide 16, this slide having a roller 17 that engages the upper edge of the said cam. A spring 18 bears upon the said slide and thereby yieldingly keeps the said roller in engagement with the said cam. A stationary resistance 19 is disposed in position to engage the traveling contact or wiper 14, which latter is connected to the amplifier 20, as shown in Fig. 7 of the drawings. The resistance 19 has one end connected, as shown in Fig. 7 of the drawings, to the final stage amplifier 21, and in shunt of the resistance 22 of the regular or usual variable resistance of the decibel dial mechanism. It will be seen that the ear-phone shown in Fig. 7 is shown as being grounded, so that the entire circuit of the apparatus is a grounded one, but it is perfectly obvious that a complete metallic circuit can be employed if such is preferable or desirable, the said grounded circuit being shown merely as a matter of convenience in the illustration of the invention. Therefore, with cam 13 as shown, when the knob 3 is turned counter-clockwise, the slide 14 rises and, in effect, shortens the resistance 19, thus in effect reducing the resistance in the decibel or volume control dial mechanism. Thus, while the adjustment of the decibel dial to the twenty-five decibel mark may be sufficient to insure twenty-five decibels for one tone, it is also sufficient for insuring the same number of decibels for a different tone. Ordinarily, in instruments of this kind, the adjustment of the frequency dial for a different tone might result in a falling off or increase in decibels, and the decibel dial would have to be adjusted accordingly, in order to insure twenty-five decibels for the different note or tone, and a plurality of scales is necessary for the decibel dial, which is calculated to be confusing in making up the record. However, with the arrangement shown and described, whereby the frequency dial mechanism is operative to control the volume, as well as the frequency, in the compensating manner shown and described, the decibel dial may remain in the position to which it was adjusted for the first tone, produced by one frequency, when the frequency dial is adjusted for successive other tones or notes, and the number of decibels will remain the same, and only the one scale is necessary for the decibel dial. As stated, for example, if twenty-five decibels are necessary for the first tone, then if the decibel dial remains at that point the number of decibels will be twenty-five for any other adjustment of the frequency dial, and only the one decibel scale is necessary.

Figure 3:
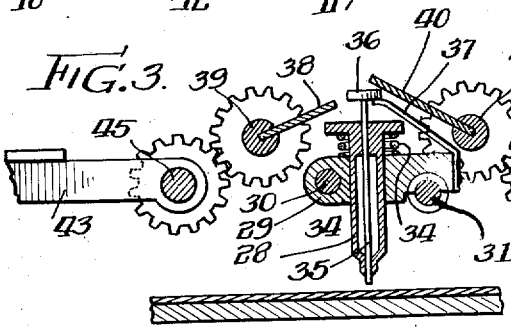
Fig. 3 is a similar view, on a larger scale, showing certain portions shown in Fig. 2, in vertical section.
Figure 4:
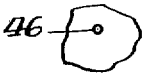
Figs. 4 and 5 are detail diagrammatic views showing the punching action on the card.
Figure 5:
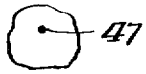

The other feature of the invention is as follows: A record card 23 can be placed on the table 11, leaving its tongue 24 exposed, through the slot 25 in the front of the body or casing of the instrument, with the vertical flanges 26 and 27 engaging the front and rear edges of the card. A vertical punch 28 is mounted to move up and down in the threaded block 29 that slides on the transverse guide-rod 30, and that engages the threaded rotary shaft 31, as shown more clearly in Fig. 3 of the drawings. When the knob 6 is rotated, it rotates the gear-wheel 32, and the latter rotates the pinion 33, and this rotates the screw shaft 31 and causes the block 29 to move in a horizontal plane and in a direction transverse of the path of travel of the said reciprocating table. A spring 34 serves to keep the head of the punch 8 in normally raised position, as shown in Fig. 3 of the drawings. A secondary punch 35 is mounted vertically in the said punch 28 and has its upper end provided with a head 36, being held in normal position by the spring 37, as shown. A blade 38 is mounted on the rotary shaft 39, for engaging the head of the primary punch 28, and a blade 40 is mounted on the shaft 41 and arranged in position for engaging the head 36 of the secondary punch. Right and left levers 42 and 43 are provided at the front of the instrument casing, on shafts 44 and 45, and gear-connected, respectively, with the shafts 41 and 39, so that these levers 42 and 43 control the operation of the blades 38 and 40. If it is the left ear that is being tested, the punch 28 will be operated by the lever 43 to make a circular dent 46 in the card; and if it is the right ear being tested, the lever 42 will be operated to cause the punch 35 to make a hole 47 in the card, with the result that a record will be made on the card, as shown in Fig. 8 of the drawings. The said different shafts, of course, can be supported in bearings on the structure, of any suitable or desired character.

It will be understood that the shape of the cam 13, to insure the same number of decibels for each successive frequency, while the decibel dial remains in one position, is something that is determined by ordinary tests, and by instruments, at the factory where the audiometer instrument is made. Obviously, the shape of said cam should be such as to insure twenty-five decibels, for example, for each successive adjustment of the frequency dial, when the decibel dial pointer is set at twenty-five decibels on the semi-circular scale thereof. Several factors enter into the shape necessary for the cam, such as the character of the various instrumentalities of the instrument, and the shape shown is merely illustrative of the mechanical function of the cam. Thus, in the construction shown and described, the reading on the decibel dial is always correct, regardless of where the pointer on the frequency dial may be adjusted, as the frequency dial, in the manner explained, has the function of volume control, in a compensating manner, as well as the function of changing or varying the frequency of the current by which the different tones or notes are produced that are made audible, by the requisite number of decibels, in the ear or head phone of the person whose hearing is being tested. This is true, it will be seen, notwithstanding that only the one scale is provided for the decibel dial. Thus, as shown and described, it is the fact that only one decibel scale is necessary that makes it possible to make the record on the card, in the manner shown and described.

Of course, it will be understood that in the use of the instrument the decibel dial may have to be adjusted several times, in order to vary the decibels, in testing the hearing of a person.

Thus the invention contemplates a frequency dial that is operative not only to vary the frequency of the current, but also to control the decibel volume, which latter is also controlled by the decibel dial. In addition, the invention contemplates the coupling of the card feeding device to the frequency dial, so that the card is given a feeding motion by the operation of this dial. In addition, the invention contemplates a punching device that is coupled to the decibel dial, so that the latter controls the position of the punch, for each operation of the latter, during the making of the record.

It will be seen that the elements 6, 7, and 22 are in the nature of a rheostat, and that the supplemental rheostat coil 19 is in shunt of the coil 22, and that the movable contact 14 can be controlled by the knob 3 without disturbing the adjustment of the indicator 7 and its knob 6 on the volume control or decibel dial. The knob 3 of the oscillator or frequency control is also mechanically coupled to the card feed by which the card 23 is fed in the horizontal plane thereof, and the knob 6 of the volume control is mechanically connected to the punch by which holes are punched in the card. The fact, therefore, that the knob 3 can be adjusted, to not only control the oscillator or frequency control, but to also operate the rheostat 14 and 19, without disturbing the adjustment of the knob 6 and its pointer or indicator 7, is an important aspect of the invention. This, of course, enables the operator or user to manipulate the knob 3 without disturbing the adjustment of the knob 6 and its pointer 7 of the volume control dial. In other words, the knob 3 has no control over the rheostat 6, 7, and 22, as this rheostat remains undisturbed when the frequency control knob is rotated. But, as explained, and as indicated in the drawings, the decibel or volume control is nevertheless desirably affected by the adjustment of the knob 3, in the manner and for the purpose explained.

While the shifting of the card edgewise, in the plane thereof, by the reciprocating carrier, through the medium of a rack and pinion connection, is accomplished from the frequency control dial, in the form of the invention shown and described, it is obvious that this automatic shifting of the card may be accomplished by any desired or suitable connection, between the card carriage and some rotary member of the adjustable dial or control system, without departing from the spirit of the invention.

While the drawings, as in Fig. 1, show stationary graduated scales 2 and 5, and movable indicating elements 4 and 7, it will be readily understood that the relative movement between the scales and their pointers or indicators can be accomplished in any suitable or desired manner, without departing from the spirit of the invention, inasmuch as it is of no importance how such relative movement is produced, so long as there is relative movement sufficient to cause in effect a traversing of the pointer or indicating element on the graduated scale for each control.

Thus with the construction shown and described, there is relative motion between the record card 23 and the punching or marking device by which impressions are made thereon, said relative motion being first a straight movement in one direction, and thereafter a straight movement in a direction at right angles to said first movement, with the result that the desired indications are made on the said card, as the result of relative movement in any suitable or desired manner, between the card and the said punch or marking device.

What we claim as our invention is:

1. In a device for testing the hearing, a manual frequency control dial, a volume control rheostat including a manual decibel volume control dial, an indicator for each dial, and devices including an adjustable rheostat connected in shunt to said volume control rheostat, and a cam for operating said shunt rheostat and operated by the frequency control dial for also controlling the decibel volume without disturbing any desired adjustment of the decibel dial, in a manner compensating for any change in the frequency, operative thereby to maintain the indicated volume fixed for any given adjustment of said volume control dial regardless of any change or different adjustment of the frequency control dial so that only a single scale is necessary for the decibel dial.

2. A structure as specified in claim 1, comprising a record card feeding support operated by the frequency dial, in combination with means for making the record on said card.

3. A structure as specified in claim 1, said devices comprising a variable resistance which compensates for any change of decibels when the frequency dial is adjusted from one frequency to another.

4. In a device for testing the hearing, a frequency control dial, a decibel dial, a record card feeding device coupled to and operated by said frequency control dial, and means for making the record on said card.

5. A structure as specified in claim 4, said card having only longitudinal motion, and said record making means comprising a punch having traveling motion transversely of said card motion, caused by adjustment of the decibel dial, with means for manually actuating the punch upon the card.

6. In a device for testing the hearing, the combination of an oscillation source including an adjustable frequency dial, a receiver supplied with said oscillations, a variable decibel volume control rheostat device for adjusting the oscillations supplied to said receiver, an adjustable rheostat connected in shunt to said volume control rheostat device, and means for coupling said variable decibel volume device to said frequency dial including a cam for operating said adjustable rheostat operative to prevent disturbance of any desired adjustment of said devices.

7. A structure as specified in claim 6, said decibel volume device being adjustable independently and having a dial of its own with a single scale thereon.

8. A structure as specified in claim 6, comprising a variable resistance in shunt of said device and operable by the frequency dial and constituting the means for controlling the decibel volume.

9. In a device for testing the hearing, a card feeding device for feeding a record card upon which to make the record of the test, and a frequency control dial having an operating handle that is mechanically coupled to and operative to actuate said card feeding device, so that the one handle serves both to operate said device and control the frequency.

10. A structure as specified in claim 9, and a decibel volume control dial coupled to and controllable by said frequency control dial, so that said one handle is operative to vary the frequency and to feed the card and to control the decibel volume.

11. A structure as specified in claim 9, comprising a traveling punch over said card, and a decibel volume control dial having a handle coupled to and operative to move the punch from one position to another, said punch being operable by hand in any position thereof.

12. In a device for testing the hearing, an adjustable oscillator frequency control dial, and record card feeding and decibel volume control devices coupled to and operable by the mechanical adjustment of said frequency control dial.

13. In a device for testing the hearing, the combination of a volume control rheostat with a dial and a rotary knob therefor, an adjustable rheostat in shunt of said volume control rheostat, an oscillator adjusting knob, for frequency control, and means including a cam whereby said oscillator knob is operative to operate said shunt rheostat without disturbing said volume control rheostat.

14. A structure as specified in claim 13, comprising a record card feed device operated by said oscillator adjusting knob, and a card punching device controlled by the said knob of the volume control rheostat.

15. A structure as specified in claim 13, said shunt rheostat having cam means for the actuation thereof by the rotation of the oscillator knob.

16. A structure as specified in claim 13, said card feed comprising a horizontal rack movable back and forth in a horizontal plane below the horizontal plane of the axis of said oscillator knob.

17. In a device for testing the hearing, instrumentalities for controlling the frequency and volume thereof, a traveling support, a record card on said support, movable with the latter in the plane thereof, mechanism for operating said support, controlled by some of said instrumentalities, and devices also controlled by some of said instrumentalities to make a record on said card.

18. A structure as specified in claim 17, said devices being connected to the volume control.

19. A structure as specified in claim 17, said mechanism being connected to the frequency control.

20. A structure as specified in claim 17, said devices comprising a punch for perforating the card.

21. A structure as specified in claim 17, said mechanism comprising a rack and pinion connection between said support and a rotary member of said instrumentalities.

22. A structure as specified in claim 17, said support being movable forward or backward, to move the card in either direction.

23. An audiometer instrument for testing the hearing, comprising a frequency control dial and a decibel volume control dial, in combination with means whereby the frequency control dial serves also to control the volume.

24. A structure as specified in claim 23, comprising means whereby said volume control is effected by the adjustment of the frequency control dial, while preventing any disturbance of the indicated volume on the decibel dial.

25. A structure as specified in claim 23, comprising a traveling card holder, with means whereby the latter is controlled from one of said dials, and devices to make the record on the card.

26. A structure as specified in claim 23, comprising a traveling card holder, with means whereby the latter is controlled from one of said dials, and devices to make the record on the card, said card holder having rectilinear motion in a horizontal plane below the axes of the two dials, and said devices having motion transverse of said rectilinear movement.

27. In an audiometer instrument for testing the hearing, the combination of an oscillation source including a frequency control having a graduated scale with an indicator for traversing the graduated path of travel, by relative movement between the scale and the indicator; a decibel or volume control rheostat having a graduated scale with an indicating element for traversing the graduated path of travel thereof, by relative movement between said element and said last mentioned scale; and instrumentalities including an adjustable rheostat connected in shunt to said volume control rheostat, and a cam to operate said shunt rheostat, for interrelating the frequency control and the volume control to provide volume control by the adjustment of the frequency control, while preventing any disturbance of the indicated reading on the graduated volume control scale.

28. An audiometer instrument comprising a record card holder, a device for making the record on said card, separate frequency and volume control dials, instrumentalities controlled by adjustment of both dials for causing relative motion between said device and said card by straight line movement in one direction when one dial is adjusted, and by straight line motion at right angles to said first motion when the other dial is adjusted, and operating means for causing the operation of said device on the card at the end of said relative motion.

29. A structure as specified in claim 28, said operating means comprising a manually operable member for the right ear, and a similar member for the left ear.

30. A structure as specified in claim 28, said device comprising a punch for one ear, and another punch for the other ear.

31. A structure as specified in claim 28, said device comprising a punch for one ear, and another punch for the other ear, one punch being within the other, so that each punch is operable on the same point on the card, but one punch being formed to make a different impression from the other.

32. A structure as specified in claim 28, said device being mounted for straight line movement over said card, while the latter is stationary.

33. A structure as specified in claim 28, having provisions whereby said first movement is caused by adjustment of the frequency dial, and other provisions whereby the second movement is caused by adjustment of the volume dial.

34. In a device for testing the hearing; associated devices comprising an electric oscillation source having frequency control means including a frequency scale element and a frequency indicator element movable one relative to the other for controllably supplying oscillations of selected different frequencies in accordance with the indication on the frequency scale; and a receiver for converting the electrical energy of said source into sound; an attenuator device including a rheostat for attenuating the electrical energy supplied from said source to said receiver; said attenuator device having attenuation control means including an attenuation scale element and an attenuation indicator element movable one relative to the other for controllably adjusting the attenuation in accordance with the indication on the attenuation scale element; and interlinking means, including an adjustable rheostat connected in shunt to said attenuator rheostat, and a cam operatively connected to said shunt rheostat, for interlinking said frequency control means with said attenuation control means and operative in a predetermined manner to prevent disturbance of the indication on said attenuator scale upon varying the adjustment of the frequency control means.

WALTER H. HUTH.
JOSEPH R. CUBERT.